Patented June 16, 1931

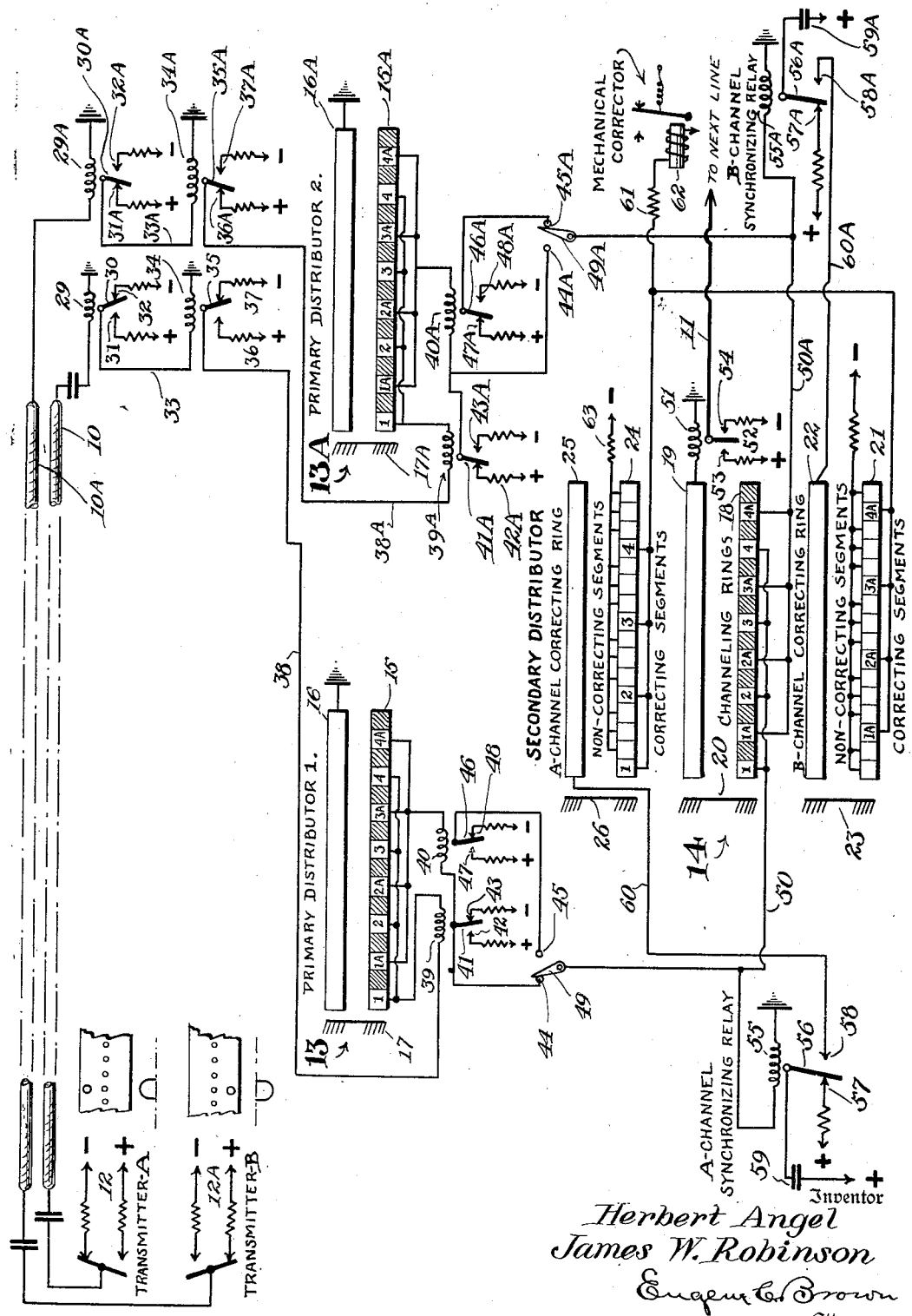

1,810,809

UNITED STATES PATENT OFFICE

HERBERT ANGEL AND JAMES W. ROBINSON, OF BROOKLYN, NEW YORK, ASSIGNORS TO THE WESTERN UNION TELEGRAPH COMPANY, OF NEW YORK, N. Y., A CORPORATION OF NEW YORK

SYNCHRONOUS TELEGRAPH SYSTEM

Application filed November 5, 1929. Serial No. 405,040.

This invention relates to telegraph systems and particularly to an apparatus for repeating telegraph impulses received from two or more cables into one cable or line.

This invention has utility in connection with ocean cables, land lines and radio circuits which are operated by means of synchronous apparatus but is especially adapted for ocean cables having high electro-static capacity over which the signal impulses become distorted and shift from proper position in the impulse interval.

To those familiar with the art of operating ocean cables with synchronous apparatus, especially with cables of the nonloaded type, it will be understood that in repeating impulses from two cables into one the receiving distributor may be thrown out of synchronism unless the inherent phase shift of the impulses is eliminated before passing the impulses from the two cables into the combining or channeling distributor which is to channel them into the next circuit, and that no matter how similar two cables may be in their electrical construction, the impulses from the cables will differ in phase. In prior systems of repeating impulses from two cables into one or vice versa no provision has been made for nullifying the disastrous effect of the shifting in phase of the impulses so that the impulses from both cables may be used for correcting the combining distributor. That is to say, impulses from one cable shift in one direction and the impulses from the other cable shift in another direction, or both in the same direction, resulting in improper operation of the correcting mechanism of the combining distributor.

Accordingly, the main object of this invention is to provide a system in which the inherent phase shift of the impulses is taken care of so that the impulses from each cable will be passed into the combining or channeling distributor practically free of impulse shift.

In accordance with the present invention, the regenerated impulses from both cables are employed for correcting purposes so that if one cable should become interrupted by signal distortion, unbalance, lightning or other causes, impulses from the other cable will automatically maintain the secondary or channeling distributor in synchronism, while the interrupted cable is being adjusted. In the prior art, one cable has been used for correcting purposes and it is obvious that interruption of this cable causes the channeling distributor to be thrown out of synchronism and results in loss of time and confusion until the other cable is switched in for correcting the channeling distributor. The present invention, therefore supplies means for automatically correcting the secondary or channeling distributor by the impulses from both cables and prevents the secondary distributor from falling out of synchronism when one of the two cables becomes interrupted.

In carrying out the present invention there are employed as many primary receiving rings, primary correcting rings and primary correcting elements as there are cables to be received from. Thus, if two cables are to be received from, there will be provided two primary receiving rings, two primary correcting rings and two primary correcting elements which in turn operate into a secondary piece of apparatus consisting of a receiving ring or rings with as many pick up and correcting segments as there are segments in the primary ring, but only one correcting element.

The various features and objects of the invention will be more fully understood upon reference to the following detailed description taken in connection with the accompanying drawing, while the scope of the invention will be particularly pointed out in the appended claims.

In the drawing the single figure is a diagrammatic illustration of the invention as applied to two cables.

The distributor rings are shown developed in the drawing for the purpose of clearly illustrating the electrical connections to all of the segments thereof. Although in the illustrated embodiment the invention has been applied to two cables it will be understood that the invention is equally applicable to more than two cables.

Referring to the drawing, 10 and 10A are the two cables over which impulses are transmitted and 11 is the line into which the impulses from the cables 10 and 10A are to be repeated. At the transmitting end the cable 10 is provided with a transmitter 12 and the cable 10A is provided with a transmitter 12A. Although in the drawing the transmitters have been shown diagrammatically as being of the tape-controlled type, it is obvious that any standard type of transmitters may be employed provided they are driven at exactly the same speed.

At the receiving end three distributors are provided; namely, a primary distributor 13 for the cable 10, a primary distributor 13A for the cable 10A and a secondary distributor 14 for channeling the impulses from the two primary distributors into the line 11. The primary distributor 13 comprises a segmented ring 15 and a solid ring 16 bridged by a pair of brushes 17. The primary distributor 13A comprises a segmented ring 15A and a solid ring 16A bridged by a pair of brushes 17A. The secondary distributor 14 comprises a segmented ring 18 and a solid ring 19 bridged by brushes 20, a segmented ring 21 and a solid ring 22 bridged by brushes 23 and a segmented ring 24 and a solid ring 25 bridged by brushes 26. All of the brushes 17, 17A, 20, 23 and 26 are arranged to operate at the same speed and the distributors are so oriented with respect to each other that all of the brushes will be on No. 1 segment at the same time and will maintain this phase relation continuously.

At the receiving end, cable 10 is connected with a main cable relay 29 the armature 30 of which operates between contacts 31 and 32 to extend positive or negative impulses over the conductor 33 to the winding of a local cable relay 34. The armature 35 of the latter relay operates between contacts 36 and 37 to extend positive or negative impulses over the conductor 38 to the winding of a regenerating relay 39 and through the said winding to the segments 1, 2, 3 and 4 of ring 15 of primary distributor 13. The ring 15 is provided with additional segments 1A, 2A, 3A and 4A intermediate the segments 1, 2, 3 and 4, respectively, as shown in the drawing, and connected through the winding of a relay 40 with the armature 41 of the relay 39. The armature 41 operates between a contact 42 connected to positive battery and a contact 43 connected with negative battery and is connected with a switch point 44. A second switch point 45 is connected with the armature 46 of the relay 40. The armature 46 operates between contact 47 connected with positive battery and contact 48 connected with negative battery.

The movable switch arm 49, which is arranged to cooperate either with contact 44 or contact 45, is connected by a conductor 50 with the segments 1, 2, 3 and 4 of a ring 18 which forms part of the secondary distributor 14. The ring 18 has in addition to the segments mentioned, four other segments 1A, 2A, 3A and 4A disposed intermediate the segments 1, 2, 3 and 4, respectively.

As the brush 20 wipes over the segments 1, 2, 3 and 4 impulses from the primary distributor 13 are transmitted over the conductor 50, segment 1, 2, 3 or 4, brush 20, ring 19 and through the winding of a channeling relay 51 to ground. Energization of channeling relay 51 operates its armature 52 into engagement with contact 53 or contact 54 to transmit a positive or negative impulse over the line 11.

When an impulse is transmitted over the conductor 50 it affects not only the channeling relay 51, but also the synchronizing relay 55 which is connected to the conductor 50 as shown. Energization of synchronizing relay 55 operates its armature 56 into engagement with contact 57 or contact 58 in accordance with the polarity of the impulse received.

Whenever a negative impulse is transmitted over the conductor 50, relay 55 moves its armature 56 into engagement with contact 58. If brush 26 is at this time on a correcting segment 1, 2, 3 or 4, condenser 59 charges over the line 60, ring 25, brush 26, the segment with which brush 26 is engaged, and then through resistance 61 and the winding of the mechanical corrector 62, causing the latter to shift the distributor brushes into proper phase with the signal impulses. On the other hand, if the brush 26 is at this time on one of the intermediate non-correcting segments, the circuit extends through resistance 63 to negative battery and the condenser is charged. When a positive impulse is extended over the conductor 50, relay 55 moves its armature 56 into engagement with contact 57, and the condenser is discharged.

The cable 10A has at its receiving end apparatus and circuit connections which are a duplicate of the apparatus and circuit connections just described in connection with cable 10. The elements associated with cable 10A have been given the same reference numerals as the corresponding elements associated with the cable 10, but with the addition of the letter "A".

From the switch arm 49A connection is made with the segments 1A, 2A, 3A and 4A on the ring 18. These segments are arranged intermediate the segments 1, 2, 3 and 4, respectively, of the ring 18. As the brush 20 wipes over the ring 18 it bridges the segments thereof with a solid ring 19 that is connected through the winding of the channeling relay 51 to ground. The primary distributors 13 and 13A are arranged so that the regenerated impulses from these distributors may be repeated to the secondary or channeling distributor 14 in proper sequence. The primary distributors may receive impulses from the two cables at exactly the same moment, in which case the regenerated impulses from the primary distributors would be repeated into the secondary distributor at the same moment and confusion of the impulses would result. In order to prevent this condition, the switches 49 and 49A have been provided so that the impulses from the primary distributors will be repeated into the secondary distributor in alternation.

In the following description it will be assumed that the brushes of the distributors are all on segment 1 and that when the brushes are so positioned, a negative impulse is transmitted from transmitter 12 over the cable 10 and a positive impulse is transmitted from the transmitter 12A over the cable 10A. The distributors 13, 13A and 14 are being driven at the same speed as by means of the well known vibrating fork apparatus for driving multiple phonic wheel distributors or by three forks vibrating at the same speed.

As the negative impulse is received over the cable 10, the relay 29 moves its armature 30 into engagement with contact 32, connecting negative battery over conductor 33, to the winding of the local cable relay 34 and ground. Armature 35 moves into engagement with contact 37, closing a circuit from negative battery over conductor 38 and through the winding of the regenerating relay 39 to the segments 1, 2, 3 and 4 of ring 15, of the A-channel distributor, over the segment 1, brush 17 and solid ring 16 to ground. Armature 41 of relay 39 moves into engagement with contact 43, connecting negative battery through contact 44, and switch arm 49 to the segments 1, 2, 3 and 4 of ring 18 of the channeling distributor and over segment 1, brush 20, ring 19 and through the winding of the channeling relay 51 to ground. Relay 51 moves its armature 52 into engagement with contact 54, and transmits a negative impulse into the line or cable 11.

The positive impulse coming in over the cable 10A energizes the cable relay 29A and moves its armature 30A into engagement with contact 31A, which transmits a positive impulse from battery through the winding of the local cable relay 34A. Armature 35A moves into engagement with contact 36A, sending a positive impulse over conductor 38A, through the winding of the regenerating relay 39A and over segment 1, brush 17A and ring 16A of the B-channel distributor to ground. Armature 41A moves into engagement with contact 42A, but produces no effect on relay 40A since at this instant the brush 17A is on segment 1.

When the brushes 17, 17A and 20 reach the segment 1A on their respective rings, the circuit for the winding of relay 40A, which was previously prepared by the relay 39A, is completed. This circuit extends from positive battery over contact 42A, armature 41A, the winding of relay 40A, and over segment 1A of ring 15A, brush 17A and solid ring 16A to ground. Armature 46A moves into engagement with its contact 47A, closing a circuit from positive battery over contact 45A, switch arm 49A, segment 1A of ring 18, brush 20, ring 19 and winding of channeling relay 51 to ground, causing armature 52 to engage contact 53, and transmit a positive impulse into the line or cable 11.

In a similar manner impulses from the cable 10 will be repeated into the line 11 when the brushes wipe over the segments 1, 2, 3 and 4 of their respective rings and impulses from the cable 10A will be repeated into the line 11 when the brushes wipe over the segments 1A, 2A, 3A and 4A of their respective rings.

When the regenerative relay 39 operated in response to the negative impulse received over the cable 10, a circuit was completed for the synchronizing relay 55, this circuit extending from negative battery over contact 43, armature 41 of relay 39, contact 44, switch arm 49 and through the winding of synchronizing relay 55 to ground. Armature 56 moved into engagement with contact 58 and charged condenser 59 over the conductor 60, ring 25, brush 26, segment 1 of ring 24, resistance 61 and the winding of the mechanical corrector 62, causing the latter to correct the phase position of the distributor brushes in the well known manner.

When the regenerative relay 40A operated in response to the positive impulse received over the cable 10A, a circuit was completed for the synchronizing relay 55A, this circuit extending from positive battery over contact 47A, armature 46A, contact 45A, switch arm 49A and through the winding of the synchronizing relay 55A to ground, causing armature 56A to move into engagement with contact 57A.

It will thus be seen that by the use of two primary distributors and a single secondary or channeling distributor, impulses received over the two cables 10 and 10A are regenerated and repeated into the line 11. It will be understood by those skilled in the art that the regenerated impulses from the primary distributors are practically the same as the original transmitted impulses and therefore the impulses transmitted into the secondary distributor are practically the same as local impulses free of any abnormal shift.

The primary distributors 13 and 13A are arranged in conjunction with the associated relays and switches so that the regenerated impulses from these distributors may be repeated into the secondary or channeling distributor 14 in proper sequence and this sequence will be maintained whether the impulses coming in over the two cables arrive simultaneously or not. The switches 49 and 49A determine the sequence of operation of the two primary distributors. With the switches in the position shown in the drawing, impulses are received by the relay 39 when the brush 17 is on the segments 1, 2, 3 and 4 and these impulses are repeated over the line 50 to the secondary distributor 14 and impulses are received by the relay 40A when the brush 17A is on segment 1A, 2A, 3A and 4A, and these impulses are repeated by the relay 40A over the line 50A to the secondary distributor 14. It follows from this that the impulses of the B-channel repeated by the primary distributor 13A, lag behind the impulses of the A-channel repeated by the primary distributor 13.

In order to make the primary distributor 13 lag behind the primary distributor 13A, the switch 49 must be thrown into engagement with contact 45 and the switch 49A must be thrown into engagement with contact 44A. With the switches so positioned, relay 39A will be energized whenever brush 17A is on a segment 1, 2, 3 or 4, to repeat an impulse over the line 50A to secondary distributor 14 and relay 40 will be energized whenever brush 17 is on a segment 1A, 2A, 3A or 4A to repeat impulses over the line 50 to the secondary distributor 14. Thus the impulses from the distributor 13 will lag behind the impulses from the distributor 14.

It is obvious that numerous changes may be made in the details set forth without departure from the essentials of the invention as defined in the following claims.

We claim:

1. In a telegraph system, two cables over which impulses are transmitted, a primary distributor at the receiving end of each of said cables, and means for repeating impulses alternately from said distributors over a single line, said means embodying a single correcting element controlled by any phase shifts of the received impulses over both of said cables.

2. In a telegraph system, two cables over which impulses are transmitted, a primary distributor at the receiving end of each of said cables, and a secondary distributor for repeating impulses alternately from said primary distributors over a single line, said primary distributors and said secondary distributor being operated in synchronism with each other and a single correcting element for fixing the phase relation of the secondary element with respect to the impulses received thereby.

3. In a telegraph system, two cables over which impulses are transmitted, a primary distributor at the receiving end of each of said cables, a secondary distributor for receiving the impulses from both of said primary distributors and repeating the same over a single line, and means for switching the connections between said primary distributors and said secondary distributor, whereby either primary distributor may be caused to lag behind the other primary distributor.

4. In a telegraph system, a receiving distributor apparatus for receiving impulses from two or more cables for being channeled or repeated into another cable or line, said receiving distributor apparatus comprising a primary receiving element for each cable over which impulses are received, and a single secondary element cooperating with all of said primary receiving elements for repeating impulses over the single cable, and a single correcting element for fixing the phase relation of the secondary element with respect to the impulses received thereby.

5. In a system for repeating impulses from a plurality of cables into a single cable, the method which comprises utilizing the impulses received from all of the cables for correcting the phase relation between the received impulses and the transmitted impulses.

6. The method of repeating impulses from a plurality of cables into a single other cable which comprises repeating an impulse from one cable of said plurality of cables into said single cable, simultaneously preparing a circuit for the repetition of an impulse from another cable of said plurality of cables into said single cable, subsequently transmitting an impulse over the prepared circuit into said single cable, and utilizing the impulses from all of said cables for correcting the phase relation between the transmitted impulses and the received impulses.

7. The method of channeling impulses from two cables into a single line which comprises repeating an impulse from one of said cables into said single line, subsequently repeating an impulse from the other of said cables into said single line and correcting the phase relation between the transmitted impulse and the received impulse during each repeating operation.

8. In a telegraph system, two cables, a primary distributor at the receiving end of each of said cables, a secondary distributor cooperating with both of said primary distributors for repeating impulses over a single line, a synchronizing relay associated with each primary distributor and controlled thereby and a single mechanical phase corrector controlled by both of said synchronizing relays.

In testimony whereof we affix our signatures.

HERBERT ANGEL.
JAMES W. ROBINSON.